United States Patent [19]

Ueno et al.

[11] Patent Number: 4,756,718
[45] Date of Patent: Jul. 12, 1988

[54] METHOD OF MANUFACTURING A FUEL CELL ASSEMBLY

[75] Inventors: Mitsushi Ueno; Noboru Segawa; Yasuji Ogami, all of Yokohama, Japan

[73] Assignee: Kabushiki Kaisha Toshiba, Kawasaki, Japan

[21] Appl. No.: 26,190

[22] Filed: Mar. 16, 1987

[30] Foreign Application Priority Data

Mar. 17, 1986 [JP] Japan .................. 61-57120

[51] Int. Cl.$^4$ ............................................. H01M 8/00
[52] U.S. Cl. ................................. 29/623.5; 29/623.1
[58] Field of Search .................... 29/623.1, 623.5; 204/2.1, 130, 180.1; 429/17, 21, 41, 49; 427/115

[56] References Cited

U.S. PATENT DOCUMENTS 3,979,227  9/1976  Katz et al. ......................... 427/115
4,555,453  11/1985  Appleby .............................. 429/41
4,615,955  10/1986  Amakawa et al. .................... 429/34

OTHER PUBLICATIONS

*J. Electrochem. Soc.*: Electrochemical Science and Technology, Apr. 1984, "Effects of Phosphoric Acid Concentration on Oxygen Reduction Kinetics at Platinum", K-L. Hsueh et al, pp. 823 through 828.

*Primary Examiner*—Aaron Weisstuch
*Attorney, Agent, or Firm*—Oblon, Fisher, Spivak, McClelland & Maier

[57] ABSTRACT

A method of manufacturing a fuel cell assembly, said assembly comprising at least one unit cell, said unit cell comprising at least two planar electrodes, said electrodes being ribbed on one side thereof and having a catalyst layer on the second side thereof, and a matrix impregnated with an electrolyte, comprising the steps of:

arranging said electrolytes on each side of said matrix with said second side of each said electrode in contact with said matrix; and polarizing the potential of at least one electrode in one of the positive and negative directions by applying a potential from an external source.

11 Claims, 3 Drawing Sheets

METHOD OF MANUFACTURING A FUEL CELL ASSEMBLY

BACKGROUND OF THE INVENTION

1. Field of the Invention

This invention relates to a method of manufacturing a fuel cell, and in particular relates to a method of manufacturing a fuel cell wherein there is little statistical scatter of the output characteristics of the unit cells of a phosphoric acid fuel cell assembly.

2. Discussion of the Background

Fuel cells are already known and are devices whereby the energy possessed by fuel can be directly converted into electrical energy. Normally in such a fuel cell, a pair of porous electrodes are arranged on each side of an electrolyte-impregnated matrix. A fluid fuel such as hydrogen is brought into contact with the back face of one electrode, while an oxidizing agent in fluid form, such as oxygen, is brought into contact with the back face of the other electrode. An electrochemical reaction then occurs, and this is used to extract electrical energy from between the two electrodes. Electrical energy can be extracted with high conversion efficiency so long as fuel and oxidizing agent are supplied.

In particular, in the case of fuel cells which employ phosphoric acid as the electrolyte, a plurality of unit fuel cells are laminated to form a laminated fuel cell assembly.

In laminating such unit cells the output characteristics of the units cells must be the same as far as possible. The reason for this is as follows. If there is statistical scatter of the unit cell characteristics of a laminated fuel cell assembly consisting of laminated unit cells, this will produce a non-uniform current distribution between cells having poor characteristics and cells having good characteristics. This will produce a non-uniform temperature distribution among the cells, with abnormal local evolution of heat. This itself assists in producing a non-uniform current distribution, which in turn accelerates the development of the non-uniform temperature distribution.

Cells which are subject to this problem show a progressive deterioration of output characteristics due to a drop in the activity of the electrode catalyst and/or due to evaporation of electrolyte, etc. and ultimately become incapable of generating electricity.

In the case of a fuel assembly laminated of a plurality of unit cells, if even one of these unit cells is incapable of generating electricity, this makes the whole fuel cell assembly incapable of generation. For this reason, to ensure stable generation of electricity over a long period, it is necessary that the assembly should be built up of unit cells whose output characteristics are, as far as possible, the same.

Normally, fuel cell manufacture is carried out with strict quality control in order to reduce such statistical scatter of the unit cell characteristics to the utmost extent. Nevertheless, cells with poor characteristics are still sometimes manufactured.

Investigation of cells with poor output characteristics has revealed the following. In a cell comprising gaseous diffusion electrodes wherein a catalyst is supported on a porous substrate, a balanced so-called three phase zone, in which catalyst, electrolyte and reaction gas co-exist, performs a vital function in ensuring that the unit cell electrode reaction proceeds smoothly.

If the action of any one of the constituents of this three phase zone is either too strong or too weak, this will hinder the smooth running of the electrode reaction. For example:

(1) If the catalyst is thickly covered with electrolyte, the supply of reaction gas to the catalyst will be obstructed, causing a drop in output due to an increase in concentration overvoltage.

(2) If there is little contact between the catalyst and electrolyte, a decrease in reaction area and an increase in ionic resistance of the electrolyte, will occur leading to a drop in output due to increase in the resistance overvoltage.

(3) If the catalyst surface area is small or the activity of the catalyst is low, a drop in output due to an increase in the activation overvoltage will occur.

In actual fuel cells, these factors interact in a complex way to bring about a drop in output.

Keeping this three phase zone balanced over a long period of time is therefore vitally important for developing long-life unit cells.

Conventionally, in cells employing an aqueous solution of, for example, phosphoric acid or potassium hydroxide as the electrolyte, in order to maintain a balanced three phase zone, a fluoropolymer such as polytetrafluoroethylene (PTFE) was used as a hydrophobic agent to prevent gross leakages of catalyst.

It is possible to control the hydrophobic character of the catalyst to some extent by addition of such a hydrophobic agent, by controlling the amount added, the method of mixing or temperature of heat treatment etc. of this agent. However, in general, once the polytetrafluoroethylene-added catalyst has lost its hydrophobic character, it is difficult to recover its original hydrophobic character without again subjecting it to heat treatment, etc.

For this reason, in order to maintain the hydrophobic character of the catalyst for as long as possible, the catalyst is given a rather strong hydrophobic character when it is applied to the porous substrate. Statistical scatter in the degree to which such hydrophobic character is successfully applied results in statistical scatter of the characteristics of the three phase zone, in particular of the degree of contact of the catalyst and the electrolyte. This results in the manufacture of cells having poor characteristics.

Accordingly, the practice is not to operate such full cell assemblies (laminated from unit cells whose three phase zones are subject to such statistical scatter of their characteristics) at large current densities right from the start, but to perform a preparatory operation for several hours to several tens of hours at low current density. By carrying out this preparatory operation, the local development of excessive current concentrations can be prevented, thereby enabling local evolution of heat to be prevented and enabling aggravation of the statistical scatter of the unit cell characteristics to be controlled.

By continuing operation at low current density, movement of the electrolyte and permeation of reaction gas in the catalytic layer are stabilized. This enables a gradual increase in formation of the three phase zones and so reduces the scatter of the unit cell characteristics.

However, the characteristics of some cells do not stabilize even after several tens of hours but require several hundreds of hours to stabilize. And even then, some cells will be found not to have stablized.

It is therefore impractical to wait until the characteristics of such cells of low and unstable characteristics have finally stabilized before operating with high current as the rated load. Thus, in practice situations may arise in which operation of a fuel cell assembly for a long period at its rated load becomes impossible. Out of necessity, attempts have therefore been made to make it possible to achieve long-period operation by using the cell assembly under partial load. None of these measures, however, are to be recommended, as they involve increased equipment costs or operating costs.

Thus, as explained above, conventional statistical scatter of the characteristics of the unit cells of a fuel cell assembly cannot be avoided, and this is a factor which accelerates the drop in output characteristics and shortens the life of such fuel cell assemblies.

The cause of this statistical scatter in the characteristics of the unit cells is statistical scatter of the three phase zones that are active in the electrode reaction. The largest contribution to this scatter is the scatter of hydrophobic characteristics of the catalyst and electrolyte. In particular, cells whose hydrophobic characteristics are too strong present a considerable problem.

SUMMARY OF THE INVENTION

Accordingly, an object of the present invention is to provide a method of manufacturing a fuel cell assembly wherein the statistical scatter of the unit cell characteristics can be reduced by reducing the scatter of the hydrophobic characteristics of the catalyst and electrolyte.

Another object of the invention is to provide unit cells which can be assembled in multiple units wherein the statistical scatter of the unit cell characteristics is reduced.

These objects and other objects of the present invention which will become apparent from the following specification have been achieved by the present method of manufacturing a fuel cell assembly, in which the assembly comprises at least two planar electrodes, the electrodes being ribbed on one side and having a catalyst layer on the second side, and a matrix impregnated with an electrolyte, comprising the steps of:

arranging the electrodes on each side of the matrix, wherein the second side of each said electrode is in contact with the matrix; and polarizing the potential of at least one electrode in the positive or negative direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
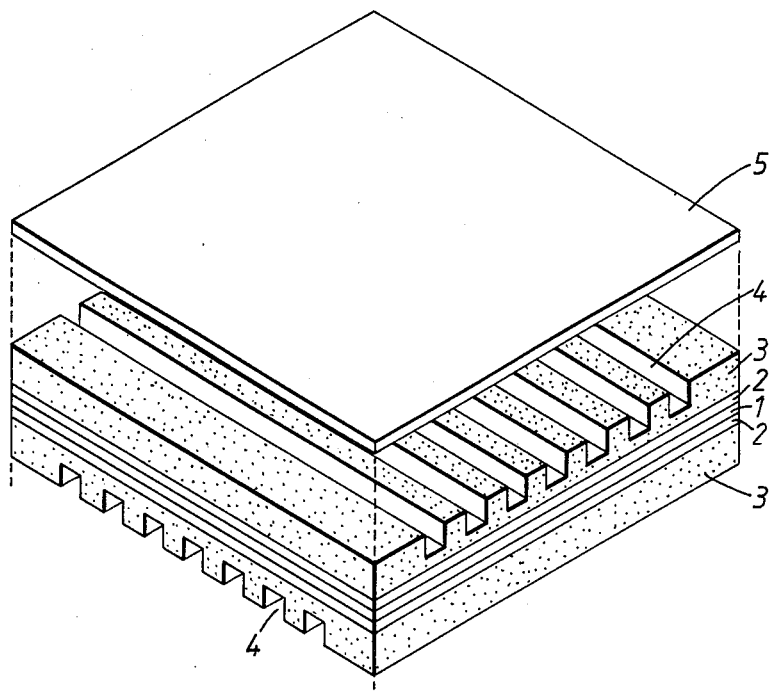
FIG. 1 is a perspective view of a fuel cell assembly to which this invention is applied.

The numbers used in the drawings correspond to the following fuel cell elements:

1—matrix
2—catalyst
3—ribbed electrode
4—flow channel
5—gas separator
6—unit cell
7—electrode plate
8—power supply

DETAILED DESCRIPTION OF THE PREFERRED EMBODIMENTS

The problems associated with the prior art can be avoided by the method of manufacturing a fuel cell assembly according to the present invention wherein unit cells are constructed by tightly arranging a negative electrode and a positive electrode, with a matrix layer impregnated with electrolyte between them. The negative electrode consists of a porous substrate on which is supported a catalyst that promotes the electrode reaction of the fuel and is endowed with a hydrophobic character, while the positive electrode consists of a porous substrate on which is supported a catalyst that promotes the electrode reaction of an oxidizing gas and is also endowed with hydrophobic character. The potential of at least one electrode is polarized with reference to the potential of that electrode itself, in the positive or negative direction or alternatively in both the positive and negative directions. This is done by sandwiching the two phases of the unit cell between conductive electrode plates consisting of carbon plates, metal plates, or tantalum plates or the like and using an external power source to apply to these electrode plates an electric field from either a positive electrode or negative electrode or fields in both directions.

By applying an electric field in either the positive direction or negative direction, or electric fields in both directions from an external electrode, across the two faces of the unit cell, the water molecules and phosphoric acid in the matrix are electrostatically attracted to the electrode at which the electric field is applied. This results in wetting of the catalyst by the aqueous phosphoric acid solution, because the water molecules and phosphoric acid are attracted to the catalyst, overcoming the hydrophobic properties of the hydrophobic agent. Before the electric field is applied, the strong hydrophobic character of the catalyst results in insufficient contact between the catalyst and the aqueous phosphoric acid solution. If the electric field is removed, wettability of the catalyst decreases somewhat, but tends to return to its original value. By repeating this operation, wettability can be maintained.

Best results are obtained if the electric field which is applied is sufficiently large to effect a considerable polarization, either in the positive or the negative direction, from the equilibrium potential of the electrodes to which the field is applied. Preferably, they are polarized into the potential region of oxygen evolution and hydrogen evolution, as wetting is thereby further promoted. Ionic complexes are then present which are formed by the phosphoric acid and water molecules in the aqueous phosphoric acid solution and by ions produced from these by electrolytic dissociation. As is well known, the water molecules are not electrically neutral but are intramolecularly polarized to form dipoles, electrical neutrality being maintained by intermolecular hydrogen bonding.

Thus, by applying a voltage in the positive or negative direction with reference to the voltage of that electrode itself from the outside to the aqueous phosphoric acid solution, the electrical balance in the aqueous phosphoric acid solution, in particular in the aqueous phosphoric acid in the vicinity of the electrode in question, is destroyed. This results in ions and water molecules of the opposite electric charge being more strongly attracted. When this attractive force overcomes the hydrophobic properties of the catalyst, the catalyst is brought into contact with the water molecules and phosphoric acid, producing wetting of the catalyst.

This invention is based on the principle of electro-osmosis, that when an electrical field is applied from outside to the surface of contact between some types of solid phases and liquid phases, relative movement of the liquid phase occurs with respect to the surface of the solid phase, and on the principle of electrostatic attraction, that movement of charged species takes place when a potential gradient is applied to a solution of an electrolyte.

However, in applying the above principles in this invention, recognition of the causes of statistical scatter of the properties of the unit cells of a fuel cell assembly, in particular, experience of and insight into conferring and adjusting the hydrophobic properties of the catalyst in three phase zones is required. A constant voltage source or a three terminal potentiostat provide effective methods of applying the required voltage. Both of these are commercially available.

Normally, a constant voltage source is effective in applying an electric field to both positive and negative electrodes. A potentiostat has three electrodes, one of which is a reference electrode. Taking the potential of this reference electrode as the reference, the potential of the required electrode can be polarized to a constant potential. It is therefore effective when only one electrode is to be polarized.

It is also possible, by combining a potentiostat and function generator, to vary the potential continuously. Or a constant potential can be applied discontinuously. Procedures of this type can be carried out automatically.

An electric field can also be applied by causing a current to flow. Low-current power sources or galvanostats are commercially available for this purpose. When such devices are used, the electrode potential is liable to change with time. It is therefore necessary to exercise care in setting the current value or observing the potential. Any of the above devices may be used singly or in combination depending on the pattern of field application which is required.

Other features of the invention will become apparent in the course of the following descriptions of exemplary embodiments which are given for illustration of the invention and are not intended to be limiting thereof.

EXAMPLES

Example 1

The invention is further described below with reference to a preferred embodiment.

A mixture was manufactured wherein 10 wt. % of platinum as a catalyst supported on carbon powder was mixed with 50 wt. % of polytetrafluoroethylene to make it hydrophobic. This mixture was applied to one face of a square porous carbon substrate of width 30 cm×length 30 cm with a density of 0.5 g/cm$^2$ in a thickness of 2 mm. A positive electrode was then produced by firing this substrate at 340° C. in an atmosphere of nitrogen gas and providing it on one surface with a plurality of gas flow channels of width 1.4 mm, depth 1.4 mm at 3 mm pitch. The end regions parallel to the gas flow channels of this positive electrode were not formed with the 10 mm-width groove but sealed by impregnating the porous material in these regions with a fluororesin to prevent lateral leakage of reaction gas.

For the negative electrode, a mixture was prepared containing 30 wt. % of polytetrafluoroethylene as the hydrophobic agent and 5 wt. % of platinum catalyst supported on carbon powder, and this was applied to a porous carbon substrate in the same way as in the case of the positive electrode. The product was then fired in an atmosphere of nitrogen gas at 330° C., then formed with channels in the same way as the positive electrode.

Next, the silicon carbide electrolyte matrix was manufactured by preparing a slurry consisting of 100 wt. parts of silicon carbide powder of mean particle diameter 5 micron, 100 wt. parts of water and 10 wt. parts of polyethylene glycol, and applying this in a thickness of 100 micron over the catalyst layers of both the positive and negative electrodes, then subjecting the product to heat treatment at 325° C. in an atmosphere of nitrogen gas. The electrolyte matrix of these positive and negative electrodes was then impregnated with 100% concentrated phosphoric acid, and the two electrodes unified to complete the manufacture of the unit cell.

A single such unit cell is shown in perspective view in FIG. 1, sectioned along vertical planes. In more detail, in FIG. 1, a unit cell consists of a pair of ribbed electrodes 3 which are formed of a porous substance, usually carbon material, to which catalyst 2 has been added, and which are arranged on both sides of a matrix 1 impregnated with the phosphoric acid electrolyte. Flow channels 4 are provided on the opposite faces of this pair of ribbed electrodes 3 to those where catalyst 2 has been added. Fluid fuel flows through the channels of one of the electrodes while fluid oxidizing agent flows through the channels of the other. The laminated fuel cell assembly is constructed by laminating these unit cells with separators 5 between adjacent cells.

Two assemblies were prepared each containing 10 such unit cells manufactured as above.

Figure 3:
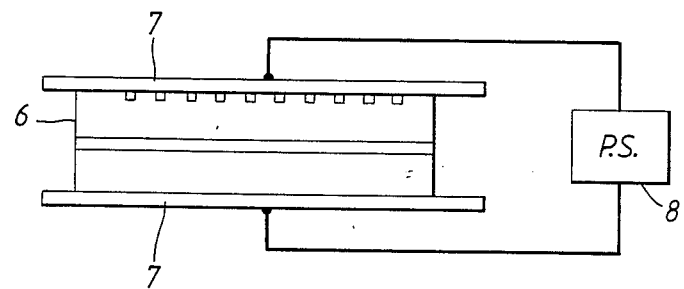
FIG. 3 is a diagram given in explanation of the method of manufacturing a fuel cell assembly according to this invention.

The invention was applied as follows to the first 10-cell assembly. Specifically, as shown in FIG. 3, the positive and negative electrodes of a unit cell 6 were sandwiched between carbon plates 7 of thickness 5 mm, width 35 cm, length 35 cm, and a voltage of 1.5 V was applied for 10 seconds from a constant-voltage D.C. power source 8, then removed for 10 seconds. This process was repeated.

Next, the same operation was repeated, interchanging the positive and negative terminals of constant-voltage D.C. power source 8. The reason for this intermittent voltage application is to control the generation of oxygen at the positive electrode and the generation of hydrogen at the negative electrode that occurs because of the rapid electrolysis of water in the phosphoric acid. When the value of the current flowing between the electrodes during voltage application was measured, it was found that the current value increased each time the current was interrupted and re-applied. This shows that there is a gradual increase and electrolysis of the water on the catalyst at the electrodes. In other words, this corresponds to an increase in reaction area due to wetting of the catalyst by the phosphoric acid.

Application of voltage as above was performed for all ten cells. The cells were then laminated by a known method with 1 mm-thick carbon separators between adjacent cells. A reaction gas feed manifold was then mounted at the four sides of this laminated assembly and fuel comprising hydrogen gas and the oxidizing gas air were then supplied. Preparatory operation of the assembly was performed at current density 10 to 100 mA/cm$^2$ for 20 hours at 200° C. Operation at the rated current density of 220 mA/cm$^2$ was then carried out and after 10 hours the cell voltages and their statistical scatter was measured. It was found that the mean voltage was 621 mV, with a standard-deviation of 11 mV.

Comparative Example 1

As a comparative example, ten unit cells were laminated and subjected to preparatory operation followed by rated operation as described for Example 1, but without voltage application as in the method of manufacture of the invention. As a result, a mean voltage of 610 mV and standard deviation of 25 mV were obtained. Thus the fuel cell assembly according to this invention showed a higher mean voltage than the fuel cell assembly of the comparative example and in addition the voltage scatter was reduced.

This reduction in voltage scatter and higher mean voltage is believed to result because, in the fuel cell assembly of this invention, the wettability of the catalyst by the phosphoric acid was increased so that the contact between the catalyst and phosphoric acid become more uniform for all the unit cells and the three phase zones that are active in the reaction are stabilized.

Example 2

Hydrogen gas was fed to the negative electrode and oxygen gas was fed to the positive electrode of a unit cell of the same construction as in Example 1. The unit cell was constructed with carbon plates arranged on each side of it next to the two electrodes. The reference electrode (standard electrode) and counter electrode of a potentiostat were connected to the negative electrode of this unit cell while the active electrode was connected to its positive electrode.

By connecting a function generator to this potentiostat, the potential of the positive electrode was swept from −0.05 to 1.8V and in the reverse direction at a sweep rate of 0.05V per second, taking the negative electrode as the hydrogen gas standard electrode (reference electrode). In electrochemistry, this method is termed "potential sweep". This method differs from that of Example 1 in that a known potential can be applied to a desired electrode. Specifically, since hydrogen gas flows through the negative electrode, it can be used as the standard electrode even if it is used as the counter electrode, since the overvoltage of a hydrogen electrode for small current loads is not more than 0.2V at the most and is practically stable.

Figure 2A:
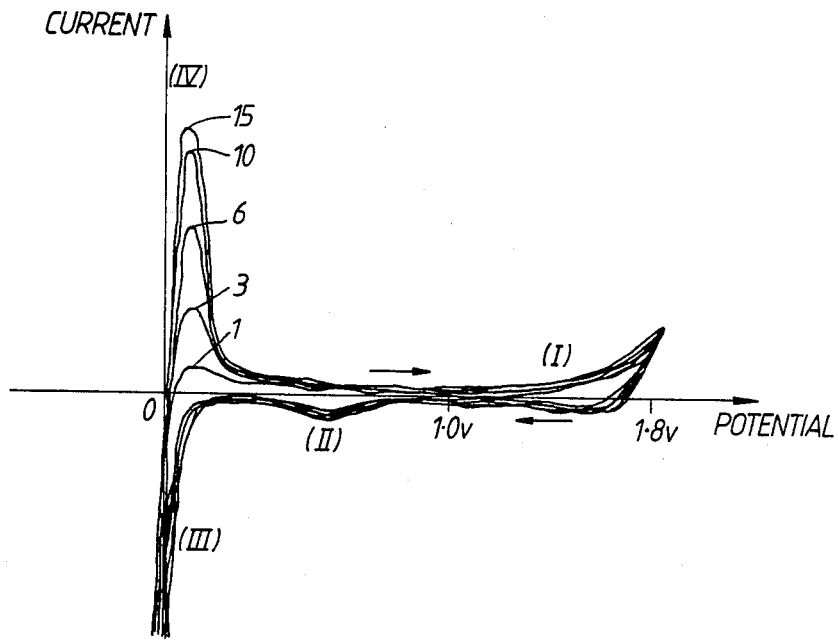
FIGS. 2a, b, c shows typical potential - current curves obtained when potential sweeping according to this invention is performed on the electrode catalyst of the unit cells.
Figure 2B:
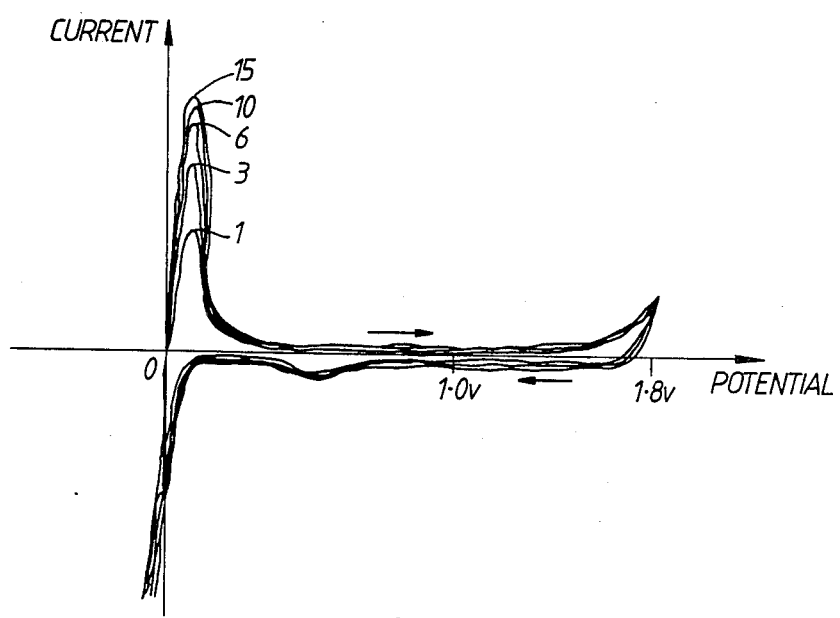
Figure 2C:
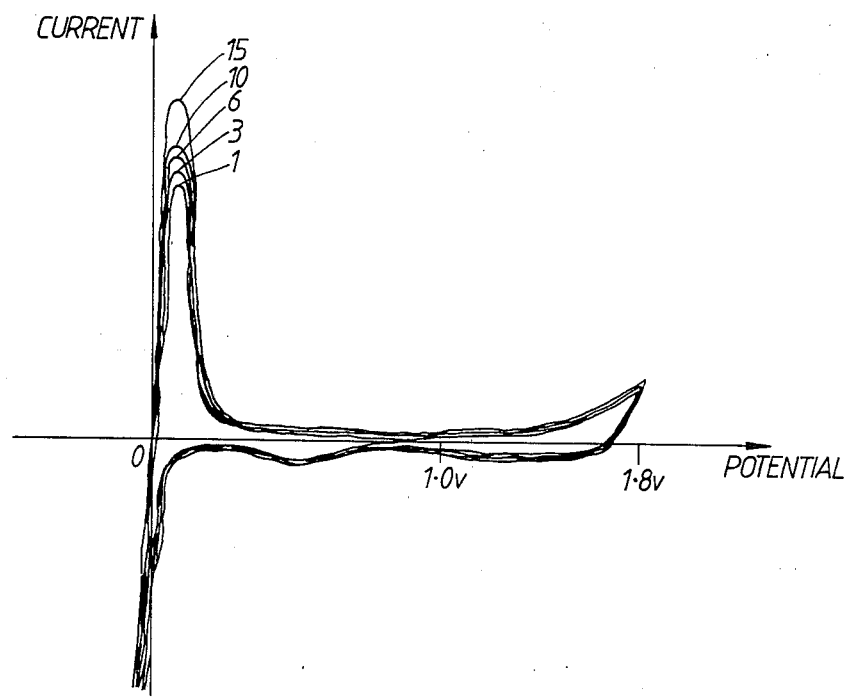

The potential-current curves shown in FIGS. 2(a), 2(b) and 2(c) were obtained by potential sweeping each of the 10 unit cells.

The significance of the potential-current curves of FIG. 2(a) will now be explained. If a potential in the positive direction is applied to the positive electrode, in the region (I), a current flows indicating absorption and generation of oxygen gas. If the potential is inverted and applied in the negative direction, in region (II) a current flows which indicates reduction of the oxygen absorbed on the catalyst. The current flow in region (III) indicates absorption and generation of hydrogen gas on the catalyst. If the potential is again inverted and applied in the positive direction, a current indicating oxidation of the hydrogen gas that was absorbed on the catalyst flows in region (IV).

As explained above, the current that accompanies oxidation or reduction is related to the activity of the catalyst and to the contact area of the catalyst and the phosphoric acid. Since the same catalyst was used in all the unit cells of this invention it may be said that the value of the current is proportional to the contact area. Inspection of FIGS. 2(a), 2(b) and 2(c) from this viewpoint reveals the following.

For convenience, we shall compare regions (IV), where there is a large peak value and a large degree of variation. The numbers (1), (3), . . . in the Figures indicate the number of times the voltage sweep is repeated. The peak shows the value of the current at that point.

In the unit cell shown in FIG. 2(a), the current value increased every time the potential sweep was repeated. This is because in this cell the wetting by the phosphoric acid was insufficient, due to a strong hydrophobic character, but when potential sweeping is repeated the extent of wetting of the catalyst by the phosphoric acid gradually increases.

In the case of the unit cell shown in FIG. 2(c), the current value is large right from the start. This shows that there is good contact between the catalyst and phosphoric acid. In such a cell, in which there is already sufficient contact between catalyst and phosphoric acid, repeated potential sweeps produce only a slight increase in the value of the current, so there is no abrupt increase in the amount of wetting.

Comparing FIGS. 2(a), 2(b) and 2(c), it can be seen that if potential sweeping is repeated about 10 times both cell 2(a), which has a strongly hydrophobic character, and cell 2(c), which has the right amount of hydrophobic character, come to display practically the same current value, and the statistical scatter of wettability between cells is diminished.

After performing the activation treatment as described above, 10 unit cells were laminated in the same way as in Example 1. A test of the generation of electricity was then carried out under the same operating conditions as in Example 1. The mean voltage was found to be 628 mV (220 mA/cm$^2$), and the standard deviation 9 mV. For comparison, the mean voltage of the fuel cell assembly of the Comparative Example 1, which had not been subjected to the activation treatment was 610 mV (220 mA/cm$^2$). Thus it can be seen that the results mentioned above represent a very satisfactory performance.

In this embodiment, the activating potential sweep was not performed on the negative electrode. This is because, when in a preliminary experiment a potential sweep was performed on the negative electrodes, passing hydrogen gas to the positive electrodes and using them as counter electrode and standard electrode the pattern of the potential-current curves which were obtained was practically the same as that shown in FIG. 2(c), indicating that the negative electrodes were already sufficiently wetted by the phosphoric acid.

In general the negative electrode is manufactured with a weaker hydrophobic character than the positive electrode. This is because the diffusivity of hydrogen, which is the active substance at the negative electrode, is high (its molecular weight is small so its speed of diffusion is high), and because the mole fraction of hydrogen in the fuel is large, i.e. 70 to 80%. When hydrogen is obtained by reforming of methane, under the ideal conditions represented by $CH_4 + 2H_2O \rightarrow 4H_2$-

+CO₂, 80% hydrogen is obtained. Furthermore, its rate of solution and speed of diffusion into the phosphoric acid are high, so the negative electrode as manufactured is rather more easily wettable.

The negative electrodes of the unit cells of this embodiment of the invention are therefore manufactured with 30 wt. % polytetrafluoroethylene (PTFE) and a heat treatment temperature of 330° C., somewhat lower than for the positive electrodes.

In contrast, the active substance of the positive electrodes is the oxygen in air. The mole fraction of oxygen in the air is small, about 20%, and its speed of diffusion is ¼ that of hydrogen (the speed of diffusion is inversely proportional to the square root of the molecular weight). Furthermore, since the rate of solution and speed of diffusion of oxygen into the phosphoric acid are small, if one attempts to obtain sufficient wetting by thickly covering the catalyst with phosphoric acid, performance is adversely affected by concentration polarization of the oxygen. The positive electrode is therefore given a rather strongly hydrophobic character so that it will be partially thickly wetted by the phosphoric acid.

The positive electrodes of the unit cells of this embodiment of the invention are therefore made hydrophobic by using 50 wt. % polytetrafluoroethylene (PTFE) and a heat treatment temperature of 340° C.

In this embodiment of the invention, the statistical scatter of wettability and statistical scatter of cell performance are diminished by repeating the potential sweep 10 times. Since the hydrophobic character depends on the method or adding hydrophobic agent to the catalyst, the method of mixing, the heat treatment temperature and the distribution of pore diameter in the catalyst layer, rhe optimum number of times this potential sweep should be repeated will of course depend on the method of manufacture of the electrodes.

It is appropriate to reduce rhe number of times the potential sweep is repeated to the minimum necessary. If the number of sweeps is more than needed, there is a progressive increase in wetting. Excessive wetting causes adverse effects such as increased concentration polarization, resulting from poor gas diffusion. The appropriate number of sweeps should therefore be determined experimentally beforehand. Depending on the method of manufacturing the catalyst layer, there will be an optimum amplitude of potential sweep and an optimum number of sweeps. Preferably stabilization of wetting is attained comparatively quickly by sweeping rhe potential of the relevant electrode through a large amplitude, e.g. near the value of the oxygen evolution potential or hydrogen evolution potential of the relevant electrode.

In preparatory operation of a fuel cell assembly laminated from unit cells, the cell voltage can be varied by repeatedly performing small current density operation followed by large current density operation and polarization carried out by this means.

The voltage scatter of cells on which this operation has been carried out is less than that of cells which have not been subjected to this operation. The same effect is obtained by repeating no-load operation followed by load operation. However, the effect is less than that obtained with Examples 1 and 2. The reason for this is believed to be that there is scatter in the potential when under load and the potential when not under load so this results in scatter of the effect itself.

If in the preparatory operation of a fuel cell assembly, the supply of fuel gas or air to the unit cells is gradually reduced, the voltage will fall. If the voltage falls below zero, i.e., becomes a negative voltage, the electrode in question is inverted in polarity. In other words, if the H₂-containing fuel gas flow is stopped, the negative electrode will be positively polarized, and, when tne oxygen evolution potential is reached, will show a negative voltage. If the flow of air is stopped, the positive electrode will be negatively polarized, become negative when the hydrogen evolution potential is reached.

Normally, owing to the strong hydrophobic character of the positive electrode, it is effective simply to repetitively stop and start the air feed.

The voltage scatter of unit cells and fuel cell assemblies on which such an operation is carried out is less than that of fuel cell assemblies on which such an operation is not performed. However, in such an operation, it is best not to operate with inverted polarity for too long a time. This is because electrical polarization of the water in the phosphoric acid may have the contrary effect of rapid reduction of the amount of water at the catalyst surface, thereby increasing the performance scatter of the cells.

Careful attention must be paid to the period of polarity inversion and the number of times this is done. In connection with the description of Example 1 a Comparative Example 1 was given in which preparatory operation was carried out at a current density of 10 to 100 mA/cm² on a fuel cell assembly laminated from 10 unit cells, followed by rated operation at a current density of 220 mA/cm². This resulted in the mean voltage of the fuel cell assembly being 610 mV and the standard deviation being 25 mV.

The potential sweep operation described in Example 2 was performed on the three unit cells of lowest performance, while these were still laminated in the fuel cell assembly. Specifically, hydrogen was fed from outside to the negative electrode of the unit cell, and the carbon separator adjacent its negative electrode was made the counter electrode and standard electrode. Nitrogen gas was fed to its positive electrode from the outside and a potential sweep operation was performed in the same way as in Example 2, making the carbon separator adjacent the positive electrode the active electrode terminal. The same operation was performed for the other two cells. In each case, patterns as shown in FIG. 2(b) were obtained for the potential - current curves.

The conclusion to be drawn from FIG. 2(b) would appear to be that in all of these cells the three phase zone had not been formed to a sufficient extent. In contrast, in the case of those unit cells which showed little scatter, when the same potential sweep operation was performed, satisfactory three phase zones with the appropriate degree of wetting of the catalyst were formed as shown in FIG. 2(c).

When a voltage generation test was performed after this potential sweep operation, the effectiveness of this invention could be seen in that the output characteristics were improved to give a mean voltage of 618 mV and standard deviation of 15 mV.

The above activation of the unit cells of fuel cell assemblies can of course be applied not only to fuel cell assemblies in which phosphoric acid is used as the electrolyte, but also to fuel cell assemblies using alkali as the electrolyte, fuel cell assemblies using an organic electrolyte, and fuel cell assemblies using a fused carbonate electrolyte.

As described above, by adjusting the wettability by electrolyte of the catalyst having a strongly hydrophobic character, a fuel cell assembly can be provided that has a high output performance and long life.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of manufacturing a fuel cell assembly, said assembly comprising at least one unit cell, said unit cell comprising at least two planar electrodes, said electrodes being ribbed on one side thereof and having a catalyst layer on the second side thereof, and a matrix impregnated with an electrolyte, comprising the steps of:

arranging said electrolytes on each side of said matrix with said second side of each said electrode in contact with said matrix; and polarizing the potential of at least one electrode in one of the positive and negative directions by applying a potential from an external source.

2. The method of claim 1, wherein said fuel is hydrogen and said electrode is polarized up to the oxygen or hydrogen evolution potential.

3. The method of claim 1, wherein said electrolyte is a member selected from the group consisting of phosphoric acid, alkalis, organic electrolytes, and fused carbonate.

4. The method of claim 3, wherein said electrolyte is phosphoric acid.

5. The method of claim 1, wherein said catalyst layer comprises a catalytic metal and a hydrophobic polymer.

6. The method of claim 5, wherein said catalytic metal is platinum.

7. The method of claim 5, wherein said hydrophobic polymer is polytetrafluoroethylene.

8. The method of claim 1, wherein both said electrodes ar polarized.

9. The method of claim 1, further comprising the step of reversing the polarization potential of said electrode at least one time.

10. The method of claim 9, wherein said reversing is performed at least two times.

11. The method of claim 1, further comprising laminating a plurality of said unit cells together.

* * * * *